US008938349B2

(12) United States Patent
Sommerer et al.

(10) Patent No.: US 8,938,349 B2
(45) Date of Patent: Jan. 20, 2015

(54) METHOD AND DEVICE FOR OPERATING A FUEL INJECTION SYSTEM

(75) Inventors: Andreas Sommerer, Kernen (DE); Patrick Amann, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 911 days.

(21) Appl. No.: 13/114,791

(22) Filed: May 24, 2011

(65) Prior Publication Data

US 2011/0307161 A1 Dec. 15, 2011

(30) Foreign Application Priority Data

Jun. 10, 2010 (DE) ........................ 10 2010 029 933

(51) Int. Cl.
*B60T 7/12* (2006.01)
*F02D 41/22* (2006.01)
*F02D 41/38* (2006.01)
*F02M 63/02* (2006.01)

(52) U.S. Cl.
CPC .......... *F02D 41/222* (2013.01); *F02D 41/3836* (2013.01); *F02M 63/0235* (2013.01); *F02D 41/3872* (2013.01); *F02D 2041/223* (2013.01); *F02D 2200/0602* (2013.01); *F02D 2200/0604* (2013.01)
USPC ........ 701/103; 701/101; 701/102; 73/114.38; 73/114.43; 73/114.45; 73/114.51

(58) Field of Classification Search
CPC ......... F02D 1/06; F02D 41/38; F02D 41/222; F02D 41/221; F02D 41/20; F02D 41/2096; F02D 41/08; F02D 41/3845; F02D 2200/0602; F02D 2041/224; F02D 41/3836; F02D 41/3872; F02D 2041/223; F02D 2200/0604; F02M 45/02; F02M 63/022; F02M 63/0225; F02M 63/0235; Y02T 10/40
USPC ......... 123/510, 511, 514, 445, 447, 456, 457; 701/101–105; 73/114.38, 114.43, 73/114.45, 114.49, 114.51; 702/33, 47, 702/50, 66, 98, 100, 105, 115, 138, 140
See application file for complete search history.

(56) References Cited

U.S. PATENT DOCUMENTS 6,276,337 B1 * 8/2001 Minato ......................... 123/456
6,349,702 B1 * 2/2002 Nishiyama .................... 123/456
6,694,953 B2 * 2/2004 Barnes et al. ................. 123/500
7,305,971 B2 * 12/2007 Fujii ............................ 123/479
7,500,471 B2 * 3/2009 Adachi et al. ................ 123/436
(Continued)

FOREIGN PATENT DOCUMENTS

DE 10 2007 032 509 1/2009

*Primary Examiner* — Hai Huynh
*Assistant Examiner* — Raza Najmuddin
(74) *Attorney, Agent, or Firm* — Kenyon & Kenyon LLP

(57) ABSTRACT

A method is described for operating a fuel injection system, in particular of an internal combustion engine, in which fuel under pressure is made available in a pressure reservoir and a fuel pressure prevailing in the pressure reservoir is ascertainable with the aid of a pressure sensor. Fuel is removed from the pressure reservoir over a predefinable pressure reduction time period, measured pressure values are ascertained (determined) with the aid of the pressure sensor at least two different points in time during the pressure reduction period, and an actual fuel pressure at the beginning of the pressure reduction period is inferred from the measured pressure values ascertained (determined) during the pressure reduction period.

12 Claims, 2 Drawing Sheets

(56) References Cited

U.S. PATENT DOCUMENTS

| | | | | |
|---|---|---|---|---|
| 7,913,666 | B2 * | 3/2011 | Achleitner et al. | 123/447 |
| 7,938,101 | B2 * | 5/2011 | Cinpinski et al. | 123/446 |
| 7,991,538 | B2 * | 8/2011 | Olbrich et al. | 701/104 |
| 8,261,605 | B2 * | 9/2012 | Hermes et al. | 73/114.51 |
| 8,281,768 | B2 * | 10/2012 | Cinpinski et al. | 123/458 |
| 8,554,454 | B2 * | 10/2013 | Hemmerlein et al. | 701/114 |
| 8,738,218 | B2 * | 5/2014 | Suda et al. | 701/30.3 |
| 8,756,985 | B2 * | 6/2014 | Hermes | 73/114.43 |
| 2001/0032619 | A1 * | 10/2001 | Nishiyama | 123/456 |
| 2003/0121501 | A1 * | 7/2003 | Barnes et al. | 123/446 |
| 2007/0028895 | A1 * | 2/2007 | Fujii | 123/446 |
| 2007/0209430 | A1 * | 9/2007 | Awano et al. | 73/119 A |
| 2009/0019926 | A1 * | 1/2009 | Sommerer | 73/114.43 |
| 2009/0177366 | A1 * | 7/2009 | Achleitner et al. | 701/103 |
| 2010/0192910 | A1 * | 8/2010 | Toyoshima | 123/456 |
| 2010/0199951 | A1 * | 8/2010 | Cinpinski et al. | 123/456 |
| 2010/0206269 | A1 * | 8/2010 | Cinpinski et al. | 123/456 |
| 2010/0224169 | A1 * | 9/2010 | Cinpinski et al. | 123/458 |
| 2012/0255348 | A1 * | 10/2012 | Hermes | 73/114.43 |

* cited by examiner

METHOD AND DEVICE FOR OPERATING A FUEL INJECTION SYSTEM

RELATED APPLICATION INFORMATION

The present application claims priority to and the benefit of German patent application no. 10 2010 029 933.2, which was filed in Germany on Jun. 10, 2010, the disclosure of which is incorporated herein by reference.

FIELD OF THE INVENTION

The present invention relates to a method for operating a fuel injection system, in particular of an internal combustion engine, in which fuel under pressure is made available in a pressure reservoir and a fuel pressure prevailing in the pressure reservoir is ascertainable with the aid of a pressure sensor. The present invention also relates to a corresponding device for operating a fuel injection system.

BACKGROUND INFORMATION

A method and device for a fuel injection system are discussed in German patent document DE 10 2007 032 509 A1. This method provides for analyzing at least one operating variable of an injector of the fuel injection system which is dependent on the fuel pressure prevailing in the pressure reservoir, in order to determine the fuel pressure. This makes it possible to monitor proper operation of a pressure sensor assigned to the pressure reservoir.

SUMMARY OF THE INVENTION

It is an object of the exemplary embodiments and/or exemplary methods of the present invention to improve a method and a device of the type mentioned at the outset, so that precise monitoring or plausibility verification of the sensor assigned to the pressure reservoir is possible.

This object may be achieved according to the exemplary embodiments and/or exemplary methods of the present invention with a method of the type mentioned at the outset, by removing fuel from the pressure reservoir over a definable pressure reduction time period, ascertaining measured pressure values with the aid of the pressure sensor at least at two different points in time during the pressure reduction time period, and determining an actual fuel pressure at the beginning of the pressure reduction time period from the measured pressure values ascertained during the pressure reduction time period.

Use is made according to the exemplary embodiments and/or exemplary methods of the present invention of the fact that a correlation exists between the removal of fuel during the pressure reduction time period and a reduction of pressure which actually occurs in the pressure reservoir. In particular, a pressure reduction determined while considering the measured pressure values ascertained according to the present invention may be used advantageously to infer, the actual fuel pressure in the pressure reservoir at the beginning of the pressure reduction period. This makes it possible to advantageously monitor the pressure sensor or verify its plausibility, for example by comparing a pressure ascertained according to the present invention at the beginning of the pressure reduction period with a measured pressure value from the same point in time of operation.

A particularly effective and calculation-efficient ascertainment of the actual fuel pressure is achieved according to an advantageous specific embodiment by ascertaining two measured pressure values during the pressure reduction period, a first measured pressure value being ascertained at the beginning of the pressure reduction period and a second measured pressure value at the end of the pressure reduction period. A pressure reduction corresponding to the difference between the two measured pressure values correlates with an actual absolute pressure in the pressure reservoir at the beginning of the pressure reduction period, so that the actual absolute pressure is inferrable from the pressure reduction.

An even more precise ascertainment of the actual fuel pressure is achieved according to another specific embodiment, when more than two measured pressure values are ascertained and taken into consideration to ascertain the actual fuel pressure. In this case it is possible, for example, to approximate a variation of the pressure over time in the pressure reservoir as it develops during the pressure reduction period, using a suitable approximation function (e.g., a hyperbola) to which the measured pressure values are assigned as control points. It is then possible in turn to ascertain an absolute pressure value from a reference variation over time and the approximation function, for example by seeking the range of the reference variation over time which coincides particularly well with the approximation function according to a predefinable measure of similarity. When using corresponding approximation functions, the variant described above may also be carried out using only two measured pressure values.

According to a particularly advantageous variant of the exemplary embodiments and/or exemplary methods of the present invention, fuel may be removed from the pressure reservoir during the pressure reduction period by activating at least one injector of the fuel injection system.

In order to not impair operation of the internal combustion engine containing the fuel injection system by the pressure reduction according to the present invention, another specific embodiment provides that the at least one injector is activated in such a way that an injection of fuel into a combustion chamber of the internal combustion engine does not yet occur. Instead, the activation may occur according to the present invention in particular in such a way that only a so-called control volume of fuel is removed from the pressure reservoir. The control volume is provided, for example, for operation of the injection system, in particular of a control valve of the injection system; in particular, it is not injected into the combustion chamber. Through an appropriate activation of an injector so that no injection of fuel into a combustion chamber takes place, but rather only the removal of a control volume from the pressure reservoir occurs, it is possible to conduct the pressure reduction according to the present invention without bringing about unintended combustion.

Besides activating a single injector to effect the pressure reduction according to the present invention, a plurality of injectors may also be activated in a coordinated way in order to realize the pressure reduction.

According to another variant of the exemplary embodiments and/or exemplary methods of the present invention, it is also conceivable to remove fuel from the pressure reservoir during the pressure reduction period by activating at least one pressure regulating valve of the injection system which is provided for removing fuel from the pressure reservoir. If the fuel injection system has additional control elements which enable removal of pressure from the pressure reservoir, these may also be utilized alternatively or additionally to reduce the pressure.

According to another variant of the exemplary embodiments and/or exemplary methods of the present invention, fuel is removed from the pressure reservoir during the pressure reduction period by activating at least one control element which is designed for removing fuel from the pressure reservoir at least once, but which may be multiple times, for a predefinable activation period during the pressure reduction period.

For example, if the removal of fuel is brought about by activating an injector in such a way that it removes only the control volume from the pressure reservoir when activated ("blank shot"), it may be provided that such a blank shot activation is carried out for a predefinable number, for example 1000, of blank shots for the pressure reduction period according to the present invention, in order to achieve the pressure reduction according to the present invention.

A particularly precise ascertainment of the actual fuel pressure is achieved, according to another specific embodiment, by performing a removal of fuel during the pressure reduction period and/or establishing the length of the pressure reduction period, as a function of a fuel pressure ascertained at the beginning of the pressure reduction period. This means that the pressure reduction process may possibly be carried out in a different manner (length of the pressure reduction period, number of individual removals of fuel, for example using blank shots) depending on an actually existing pressure.

The pressure reduction period may be particularly set in such a way that it occurs during a coasting or caster operation of the internal combustion engine. According to another variant of the exemplary embodiments and/or exemplary methods of the present invention, it is also possible that a control and/or regulation which influences the fuel pressure in the pressure reservoir, a rail pressure regulator for example, is at least partially deactivated during the pressure reduction within the pressure reduction period, so as not to distort the ascertainment according to the present invention of the actual fuel pressure. A pressure reduction according to the present invention may also be conducted, for example, despite an active rail pressure regulator, as long as a corresponding control deviation exhibits positive values, i.e., the instantaneous rail pressure is greater than a setpoint pressure. In this case, along with its primary purpose, ascertainment of the actual rail pressure, the pressure reduction according to the present invention also contributes at the same time to regulating the rail pressure.

According to another advantageous variant, it may also be provided that a removal of fuel from the pressure reservoir within the pressure reduction period continues until the fuel pressure ascertained with the aid of the pressure sensor, and/or its change over time, falls below a predefinable threshold value. For example, the pressure reservoir may also be completely emptied during the pressure reduction according to the present invention, which may be recognized from the fact that the pressure sensor shows an infinitesimal rail pressure value, or else that a time gradient of the rail pressure value falls below a predefinable threshold value.

A device according to the description herein is also specified as an additional approach to the object of the exemplary embodiments and/or exemplary methods of the present invention.

Additional advantages, features and details may be seen from the following description, in which various exemplary embodiments of the present invention are depicted in reference to the drawing. The features mentioned in the claims and in the description may be essential to the present invention individually on their own, or in any combination.

DETAILED DESCRIPTION

Figure 1:
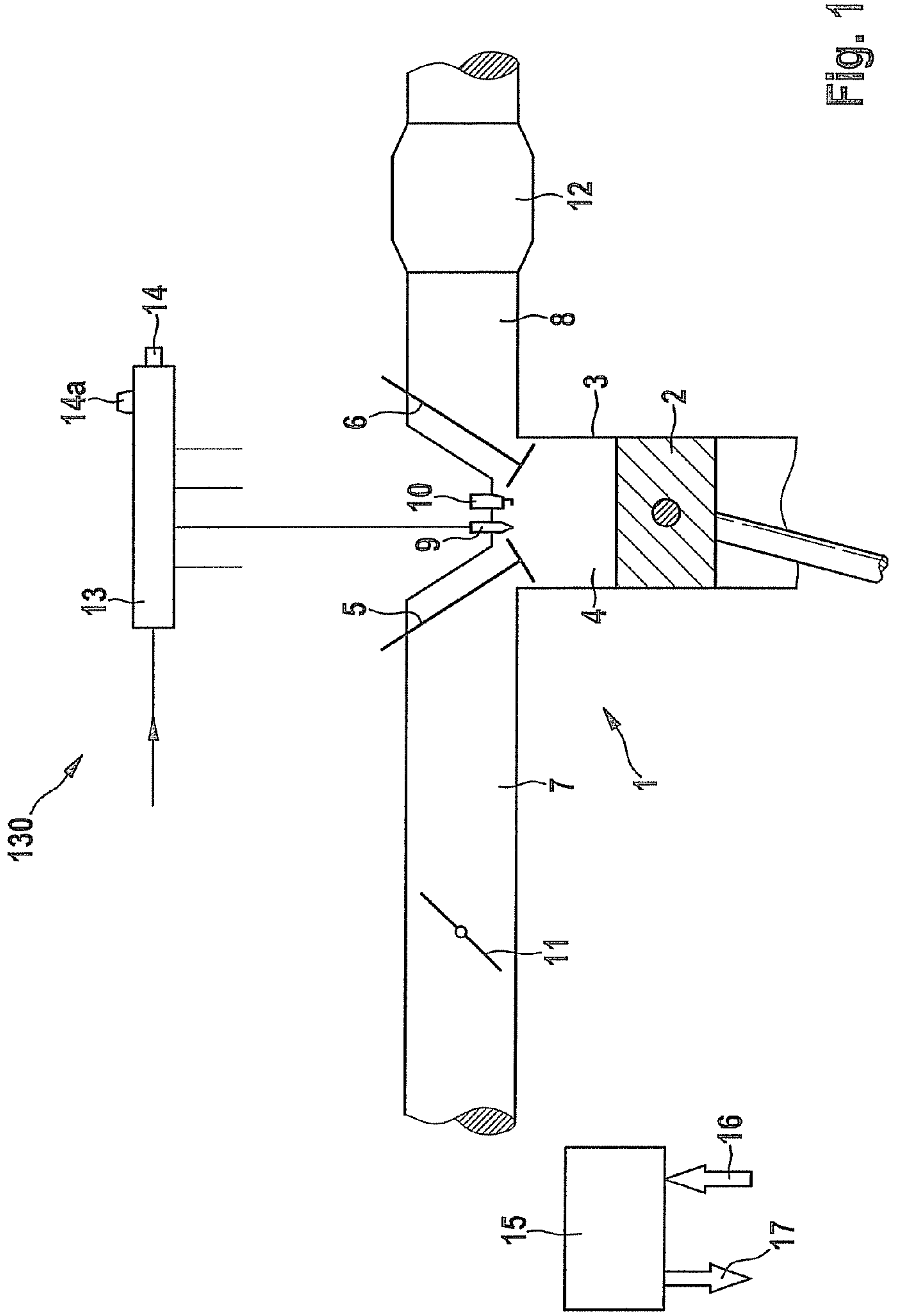
FIG. 1 shows a schematic block diagram of an internal combustion engine for executing the method according to the present invention.

FIG. 1 depicts an internal combustion engine 1 of a motor vehicle, in which a piston 2 is movable back and forth in a cylinder 3. Cylinder 3 is provided with a combustion chamber 4, which is delimited by piston 2, an intake valve 5 and an exhaust valve 6, among other elements. An intake pipe 7 is coupled with intake valve 5, and an exhaust pipe 8 is coupled with exhaust valve 6.

An injector 9 and a spark plug 10 protrude into combustion chamber 4 in the area of intake valve 5 and exhaust valve 6. Fuel may be injected into combustion chamber 4 through injector 9. The fuel in combustion chamber 4 is ignitable using spark plug 10. A fuel injection system of internal combustion engine 1 is designated by reference numeral 130.

Accommodated in intake pipe 7 is a rotatable throttle valve 11, through which air may be supplied to intake pipe 7. The volume of supplied air is dependent on the angular position of throttle valve 11. Accommodated in exhaust pipe 8 is a catalytic converter 12, which serves to clean the exhaust gases generated by the combustion of the fuel.

Injector 9 is connected to a fuel reservoir 13 via a pressure line. The injectors of the other cylinders of internal combustion engine 1 are also connected to fuel reservoir 13 in a similar manner. Fuel reservoir 13 is supplied with fuel via a supply line. To this end, an electrical and/or mechanical fuel pump is provided, which is suitable for building up the desired pressure in fuel reservoir 13.

In addition, a pressure sensor 14 by which the pressure in fuel reservoir 13 is measurable is situated on fuel reservoir 13. This pressure is the pressure which is exerted on the fuel, and thus by which the fuel is injected into combustion chamber 3 of internal combustion engine 1 through injector 9. Fuel system 130 may also have a pressure regulating valve **14*a*, which is designed to remove fuel from pressure reservoir 13**.

When internal combustion engine 1 is in operation, fuel is transported into fuel reservoir 13. This fuel is injected through injectors 9 of the individual cylinders 3 into the pertinent combustion chambers 4. With the aid of spark plugs 10, combustions are produced in combustion chambers 3, whereby pistons 2 are set into back-and-forth motion. These motions are transmitted to a crankshaft (not shown), and exert a torque on the latter.

A control unit 15 receives input signals 16, which represent operating variables of internal combustion engine 1 measured with the aid of sensors. For example, control unit 15 is connected to pressure sensor 14, an air mass sensor, a lambda sensor, a rotational speed sensor, and the like. Furthermore, control unit 15 is connected to an accelerator pedal sensor, which generates a signal which indicates the position of an accelerator pedal operated by the driver, and thus the requested torque. Control unit 15 generates output signals 17, by which the behavior of internal combustion engine 1 may be influenced via actuators or control elements. For example, control unit 15 is connected to injector 9, spark plug 10 and throttle valve 11 and the like, and generates the signals required to activate them.

Among other things, control unit 15 is intended for controlling and/or regulating the operating variables of internal combustion engine 1. For example, the mass of fuel injected by injector 9 into combustion chamber 4 is controlled and/or regulated by control unit 15, in particular with regard to low fuel consumption and/or low development of pollutants. To this end, control unit 15 is provided with a microprocessor, which has a computer program stored in a storage medium, in particular a flash memory, which is suitable for carrying out the above-mentioned controlling and/or regulating.

Figure 3:
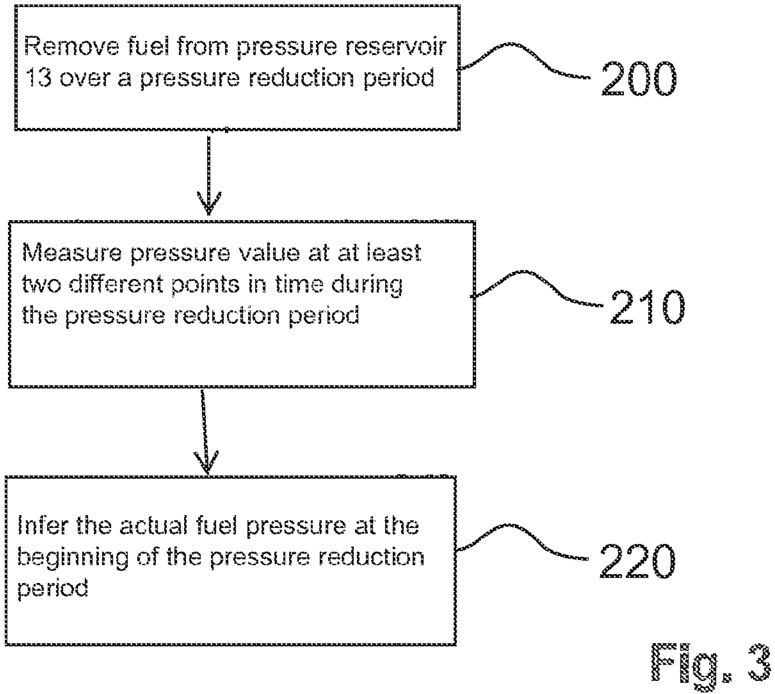
FIG. 3 shows a simplified flow chart of one specific embodiment of the method according to the present invention.

In order to check the functioning of pressure sensor 14 or to verify the plausibility of corresponding measured pressure values, the method described below with reference to the flow chart according to FIG. 3 is provided.

In a first step 200, fuel is removed over a predefinable pressure reduction time period from pressure reservoir 13 (FIG. 1), in order to reduce the fuel pressure in a controlled manner.

The object of subsequent step 210 is to ascertain measured pressure values with the aid of pressure sensor 14 (FIG. 1) at least two different points in time during the pressure reduction period.

Finally, in step 220 of the method according to the present invention, the actual fuel pressure at the beginning of the pressure reduction period is inferred from the measured pressure values during the pressure reduction period (step 210).

The method according to the present invention is based on the understanding that a defined pressure reduction in pressure reservoir 13 (FIG. 1), as achieved in the present case by step 200 of the method according to FIG. 3, allows the actual fuel pressure at the beginning of pressure reduction phase 200 to be inferred.

In a specific embodiment, the length of the pressure reduction period is chosen to be constant. The pressure difference between the measured pressure values ascertained in step 210 contains information about an absolute fuel pressure at the beginning of pressure reduction phase 200.

Figure 2:
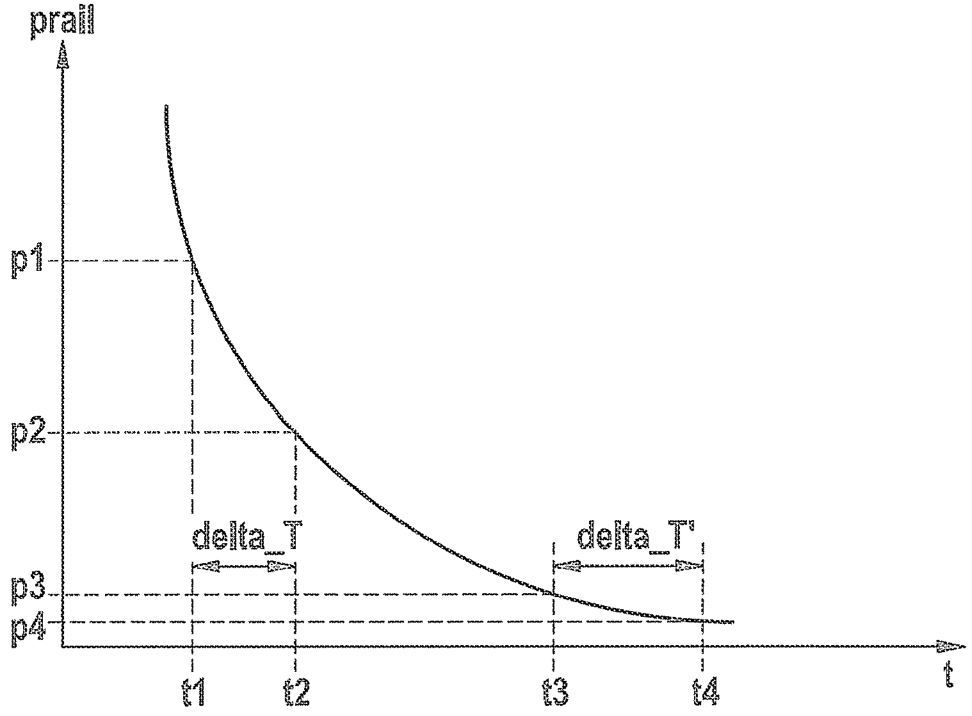
FIG. 2 shows a variation over time of operating variables of the internal combustion engine according to FIG. 1.

As illustrated in the pressure-time diagram of FIG. 2 (rail pressure prail plotted over time t), another advantageous specific embodiment of the method according to the present invention provides for determining a first measured pressure value p1 at beginning t1 of pressure reduction period delta_T.

Finally, at the end of the pressure reduction cycle according to the present invention, namely at point in time t2, a second measured pressure value p2 is ascertained. From the two measured pressure values p1, p2 ascertained with the aid of pressure sensor 14 (FIG. 1), it is possible according to the present invention to advantageously form a pressure difference p1−p2 which permits conclusions to be drawn about the actual fuel pressure at point in time t1. A corresponding evaluation is performed in step 220 of the method according to the present invention already described (FIG. 3).

For example, for a known pressure reduction period delta_T, a relationship between the pressure difference p1−p2 and an actual rail pressure at beginning t1 of pressure reduction period delta_T may be stored in control unit 15 (FIG. 1), for example in the form of a characteristic curve or characteristic map.

Within the evaluation according to the present invention (step 220), it may be provided that an actual fuel pressure (rail pressure) at point in time t1 is compared with the measured pressure value p1 detected metrologically using pressure sensor 14. As long as these two values do not differ by more than a predefinable tolerance, it may be concluded that pressure sensor 14 is working properly.

But if there is a relatively large difference between the observed variables, it may be concluded that pressure sensor 14 is not working properly, and consequently that measured pressure values p1, p2 are not reporting the actual fuel pressure in pressure reservoir 13 reliably. In this case an error response, such as an emergency operating state of internal combustion engine 1 (FIG. 1), may be initiated.

Another specific embodiment of the method according to the present invention provides for executing the pressure reduction (step 200 in FIG. 3) according to the present invention regarding the length of pressure reduction period delta_T and/or the nature and manner of the removal of fuel from pressure reservoir 13 as a function of a fuel pressure p1 ascertained at the beginning of the pressure reduction period. That makes it possible to advantageously make allowance for the fact that the essentially approximately hyperbolic time curve of fuel pressure prail yields a relatively small pressure difference p3−p4 when fuel is removed continuously starting from a lower actual fuel pressure at beginning t3 of pressure reduction period delta_T', whereas when the method according to the present invention is carried out in a range of a higher actual fuel pressure, for example between points in time t1 and t2, a greater pressure difference of measured pressure values p1, p2 is obtained, which enables a more precise determination of the actual fuel pressure at beginning t1 of pressure reduction period delta_T.

This means that the precision of the method according to the present invention may be adjusted advantageously to the operating point, in particular an actual fuel pressure or a metrologically detected fuel pressure p1, p3 at beginning t1, t3 of pressure reduction period delta_T, delta_T'. It is conceivable to provide different characteristic curves or characteristic maps for pressure reduction periods delta_T, delta_T' of different lengths, which make it possible to infer an actual pressure, step 220, from the difference of measured pressure values obtained in step 210.

In a specific embodiment it is provided, during pressure reduction period delta_T, to activate at least one control element 9, 14*a* (FIG. 1) which is designed to remove fuel from pressure reservoir 13 at least once, but which may be multiple times, for a predefinable activation period, during pressure reduction period delta_T.

To this end, it is particularly possible, for example, to activate injector 9 in such a way that the activation does not yet cause an injection of fuel into combustion chamber 4 of internal combustion engine 1, thereby preventing unwanted combustions. Instead, the activation of injector 9 may take place for the type of pressure reduction (step 200) in such a way that, as a result of the activation, injector 9 removes only a control volume of fuel from pressure reservoir 13, as needed—in a manner known to those skilled in the art—for internal operation of injector 9, for example for operation of a control valve of injector 9. The removal of a control volume within the activation therefore brings about on the one hand a defined removal of fuel from pressure reservoir 13, while fuel is not yet injected into combustion chamber 4.

The activation of injector 9 described above is also referred to as blank shot activation, and may be used to accomplish the pressure reduction in pressure reservoir 13 according to the exemplary embodiments and/or exemplary methods of the present invention. For example, the pressure reduction according to the present invention over pressure reduction period delta_T may include some 1000 blank shot activations of injector 9, so that during pressure reduction period delta_T a total of approximately 1000 times the control volume of fuel is removed from pressure reservoir 13.

There may also be provision to remove fuel, simultaneously or alternatingly, in particular again only a control volume in each case, using other injectors, not depicted in FIG. 1, of internal combustion engine 1.

Alternatively or in addition to the removal of fuel from pressure reservoir 13 through injectors 9, another control element suitable for removing fuel, for example pressure regulating valve 14*a*, may also be used to remove fuel from pressure reservoir 13 for the pressure reduction according to the present invention.

In another advantageous specific embodiment, it is provided to detect more than two measured pressure values p1, p2 during pressure reduction period delta_T. This makes it possible, for example, to determine with relatively great precision a point prail(t) on the rail pressure hyperbola from FIG. 2, that is, an actual rail pressure at beginning t1 of pressure reduction period delta_T.

In order to not impair operation of an internal combustion engine containing fuel injection system 130, it may be provided that the pressure reduction period delta_T according to the present invention is placed into a coasting or caster operation of internal combustion engine 1.

It is also possible, according to another specific embodiment, to carry out the removal of fuel (step 200) from pressure reservoir 13 within pressure reduction period delta_T until the fuel pressure ascertained with the aid of pressure sensor 14 and/or its change over time falls below a predefinable threshold value, for example until a measured fuel pressure value has a value of approximately 0 or until there is no significant additional change over time.

The method according to the exemplary embodiments and/or exemplary methods of the present invention advantageously enables precise ascertainment of an actual fuel pressure prail in pressure reservoir 13, a particularly high precision being achieved in fuel systems 130 which exhibit only minimal or infinitesimal high pressure leakage. Tolerances which may arise in the blank shot operation of the injectors may be reduced advantageously with the aid of minimum-volume correction functions known to those skilled in the art.

According to another specific embodiment, variations in the compression module of the fuel may be accounted for by comparison measurements on a reference system. Corresponding adjustment parameters may be stored in control unit 15.

Evaluation 220 according to the exemplary embodiments and/or exemplary methods of the present invention (FIG. 3) enables the actual fuel pressure at beginning t1 of pressure reduction period delta_T to be ascertained with high precision, and thus makes it possible to advantageously verify the plausibility of the measured pressure value values p1 delivered by pressure sensor 14.

The principle according to the exemplary embodiments and/or exemplary methods of the present invention is usable in general in all fuel systems having pressure reservoirs, in particular in fuel systems for internal combustion engines having self-ignition and/or externally supplied ignition.

What is claimed is:

1. A method for operating a fuel injection system of an internal combustion engine, the method comprising:

providing fuel under pressure in a pressure reservoir;

removing the fuel from the pressure reservoir over a predefinable pressure reduction time period;

determining measured pressure values with the pressure sensor at at least two different points in time during the pressure reduction period; and inferring an actual fuel pressure at the beginning of the pressure reduction period from the measured pressure values determined during the pressure reduction period.

2. The method of claim 1, wherein two measured pressure values are determined during the pressure reduction period, wherein a first measured pressure value is determined at the beginning of the pressure reduction period and a second measured pressure value at the end of the pressure reduction period.

3. The method of claim 1, wherein more than two measured pressure values are determined during the pressure reduction period and used for determining the actual fuel pressure at the beginning of the pressure reduction period.

4. The method of claim 1, wherein fuel is removed from the pressure reservoir during the pressure reduction period by activating at least one injector of the fuel injection system.

5. The method of claim 4, wherein the at least one injector is activated so that an injection of fuel into a combustion chamber of the internal combustion engine does not yet occur, and wherein the activation is done so that only a control volume of fuel is removed from the pressure reservoir, which is used for operation of the injector, including operations of a control valve of the injector, and is not injected into a combustion chamber.

6. The method of claim 1, wherein fuel is removed from the pressure reservoir during the pressure reduction period by activating at least one pressure regulating valve of the fuel injection system which is provided for removing fuel from the pressure reservoir.

7. The method of claim 1, wherein fuel is removed from the pressure reservoir during the pressure reduction period by activating at least one control element which is configured for removing fuel from the pressure reservoir, one time or multiple times for a predefinable activation period, during the pressure reduction period.

8. The method of claim 1, wherein at least one of the following is performed: (a) fuel is removed during the pressure reduction period and (b) a length of the pressure reduction period is established as a function of a fuel pressure determined at the beginning of the pressure reduction period.

9. The method of claim 1, wherein the pressure reduction period occurs during a coasting or coaster operation of the internal combustion engine.

10. The method of claim 1, wherein at least one of a control and a regulation which influences the fuel pressure in the pressure reservoir is at least partially deactivated during the pressure reduction within the pressure reduction period.

11. The method of claim 1, wherein at least one of the following is satisfied: (a) a removal of fuel from the pressure reservoir within the pressure reduction period continues until the fuel pressure determined with the aid of the pressure sensor; and (b) and its change over time, falls below a predefinable threshold value.

12. A device for operating a fuel injection system of an internal combustion engine, in which fuel under pressure is made available in a pressure reservoir and a fuel pressure prevailing in the pressure reservoir is determinable with a pressure sensor, comprising:

a removal arrangement to remove fuel from the pressure reservoir over a predefinable pressure reduction time period;

a determining arrangement to determine measured pressure values with the pressure sensor at at least two different points in time during the pressure reduction period, and to infer an actual fuel pressure at the beginning of the pressure reduction period from the measured pressure values determined during the pressure reduction period.

* * * * *